United States Patent [19]

Galle

[11] Patent Number: 5,370,153

[45] Date of Patent: Dec. 6, 1994

[54] METAL SEAL HYDRAULIC COUPLING

[75] Inventor: Gary L. Galle, Houston, Tex.

[73] Assignee: ABB Vetco Gray Inc., Houston, Tex.

[21] Appl. No.: 168,607

[22] Filed: Dec. 16, 1993

[51] Int. Cl.⁵ ............................................. F16L 37/28
[52] U.S. Cl. ............................ 137/614.04; 251/149.6; 285/331
[58] Field of Search .............. 137/614, 614.02, 614.03, 137/614.04, 614.05; 251/149.6, 149.7, 149.1, 149.3; 285/331, 917, 332.3

[56] References Cited

U.S. PATENT DOCUMENTS

| | | |
|---|---|---|
| 458,349 | 8/1891 | Greene . |
| 984,470 | 2/1911 | Carence et al. . |
| 1,217,859 | 2/1917 | Drader et al. . |
| 4,209,193 | 6/1980 | Ahlstone ........................ 285/309 |
| 4,603,886 | 8/1986 | Pallini, Jr. et al. ............... 285/24 |
| 4,801,160 | 1/1989 | Barrington ...................... 285/81 |
| 4,854,615 | 8/1989 | Smith, III ....................... 285/331 |
| 5,044,672 | 9/1991 | Skeels et al. .................. 285/917 X |
| 5,110,144 | 5/1992 | Burton et al. ................. 285/917 X |
| 5,232,021 | 8/1993 | Smith ............................ 137/614.04 |
| 5,285,853 | 2/1994 | Eckert et al. ................. 285/917 X |

Primary Examiner—Gerald A. Michalsky
Assistant Examiner—Kevin L. Lee
Attorney, Agent, or Firm—James E. Bradley

[57] ABSTRACT

An hydraulic coupling has a male member and a female member for sealing engagement one with the other. The male and female members are maintained in axial engagement by an axial load. The male member and the female member each have an annular body having an axial bore therethrough for the passage of fluid. Metal, concentric inner and outer annular seal legs extend from the body of the female member, and define an annular sealing recess between the seal legs. The seal legs have opposed tapered walls that define female sealing surfaces. An annular metal sealing wedge extends from the body of the male member and has inner and outer tapered walls that define male sealing surfaces for insertion into the sealing recess for sealingly engaging the female sealing surfaces. The axial load through the male and female members is supported solely though the male and female sealing surfaces so that the axial load results in a wedge-like action between the sealing recess and the sealing wedge. The wedge-like action deflects one of the seal legs thus allowing surface contact between the male and female sealing surfaces.

16 Claims, 3 Drawing Sheets

METAL SEAL HYDRAULIC COUPLING

BACKGROUND OF THE INVENTION

1. Field of the Invention

This invention relates in general to hydraulic couplings and in particular to a metal-to-metal seal for a hydraulic coupling.

2. Description of the Prior Art

Many current subsea hydraulic couplings employ elastomeric seal elements to effect a hydraulic seal. However, elastomeric seals are subject to wear and tear in coupling applications. Because of harsh operating conditions and the susceptibility of elastomeric seals to wear and tear, hydraulic couplings that employ elastomeric seals do not have a sufficiently long service life.

Some existing couplings employ metal-to-metal seals as primary seal elements. However, the metal seal hydraulic couplings built before this invention are complicated and employ very delicate seal elements such as metal o-rings, or metal face seals. Seals of this nature are particularly sensitive to misalignment, connection and disconnection at an angle, and debris. As a result of this sensitivity, relatively small manufacturing tolerances are required, thus substantially increasing cost. Also, when the metal seal elements of the couplings built before this invention wear out, the seal integrity is compromised, thereby further reducing the service life of the couplings.

SUMMARY OF THE INVENTION

It is the general object of the invention to provide a metal-to-metal seal for use in a subsea hydraulic coupling that results in a coupling that has a long service life and that is insensitive to misalignment, connection and disconnection at an angle, and debris.

The hydraulic coupling has a male member and a female member for sealing engagement one with the other. The male and female members are maintained in axial engagement by an axial load. The male member and the female member each have an annular body having an axial bore therethrough for the passage of fluid. Metal, concentric inner and outer annular seal legs extend from the body of the female member, defining an annular sealing recess between the seal legs. The seal legs have opposed tapered walls that define female sealing surfaces. An annular metal sealing wedge extends from the body of the male member and has inner and outer tapered walls that define male sealing surfaces for insertion into the sealing recess for sealingly engaging the female sealing surfaces. The axial load through the male and female members is supported solely though the male and female sealing surfaces so that the axial load results in a wedge-like action between the sealing recess and the sealing wedge. The wedge-like action deflects one of the seal legs thus allowing surface contact between the male and female sealing surfaces. This improved design results in a hydraulic coupling that has a long service life and that is insensitive to misalignment, connection and disconnection at an angle, and debris.

The above as well as additional objects, features, and advantages will become apparent in the following description.

DETAILED DESCRIPTION OF THE INVENTION

Figure 1:
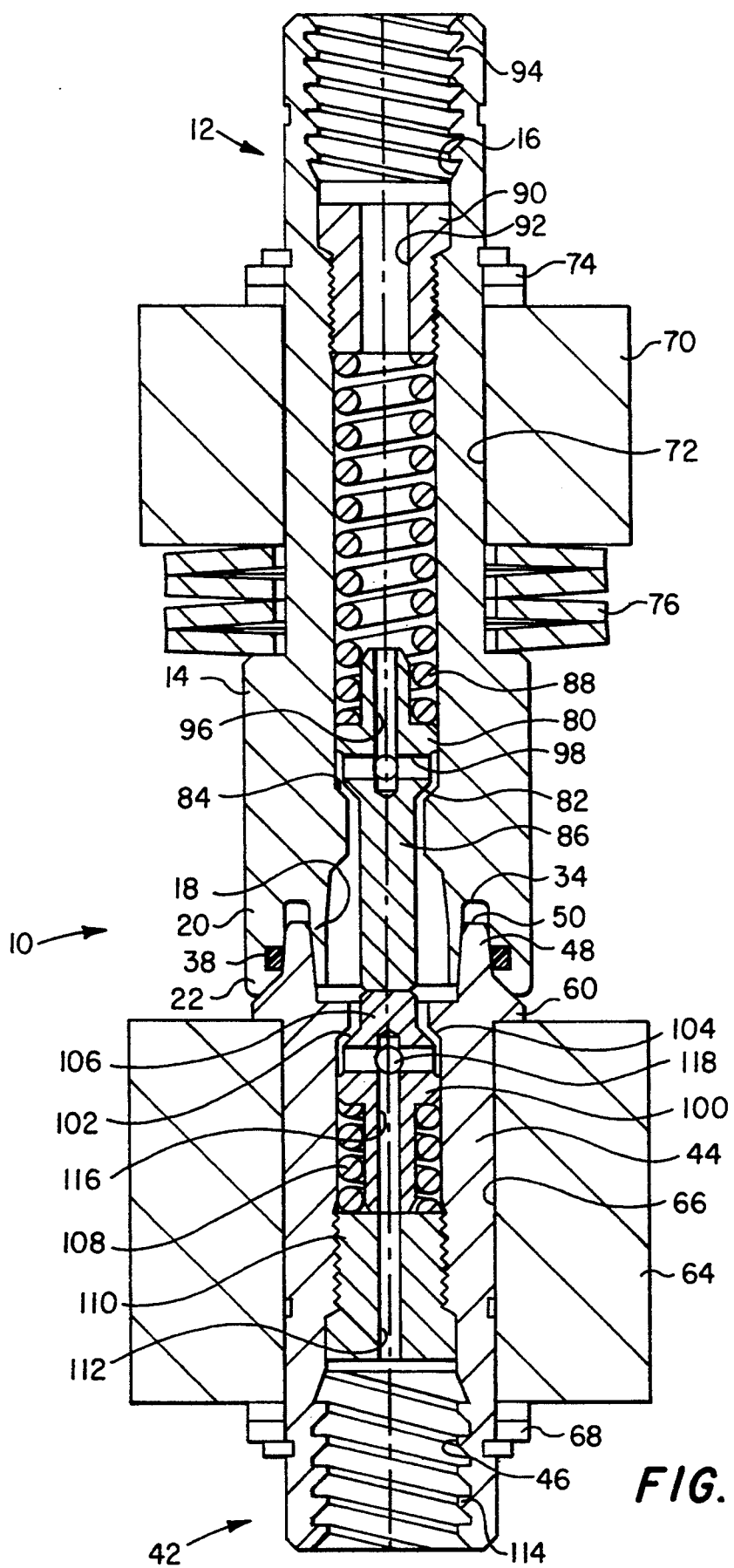
FIG. 1 is a vertical sectional view illustrating the coupling of this invention.

Referring to FIG. 1, hydraulic coupling 10 is a hydraulic coupling of the type used in sub-sea oil and gas production operations. Coupling 10 serves to sealingly couple the ends of two pipes (not shown) carrying hydraulic fluid.

Figure 2:
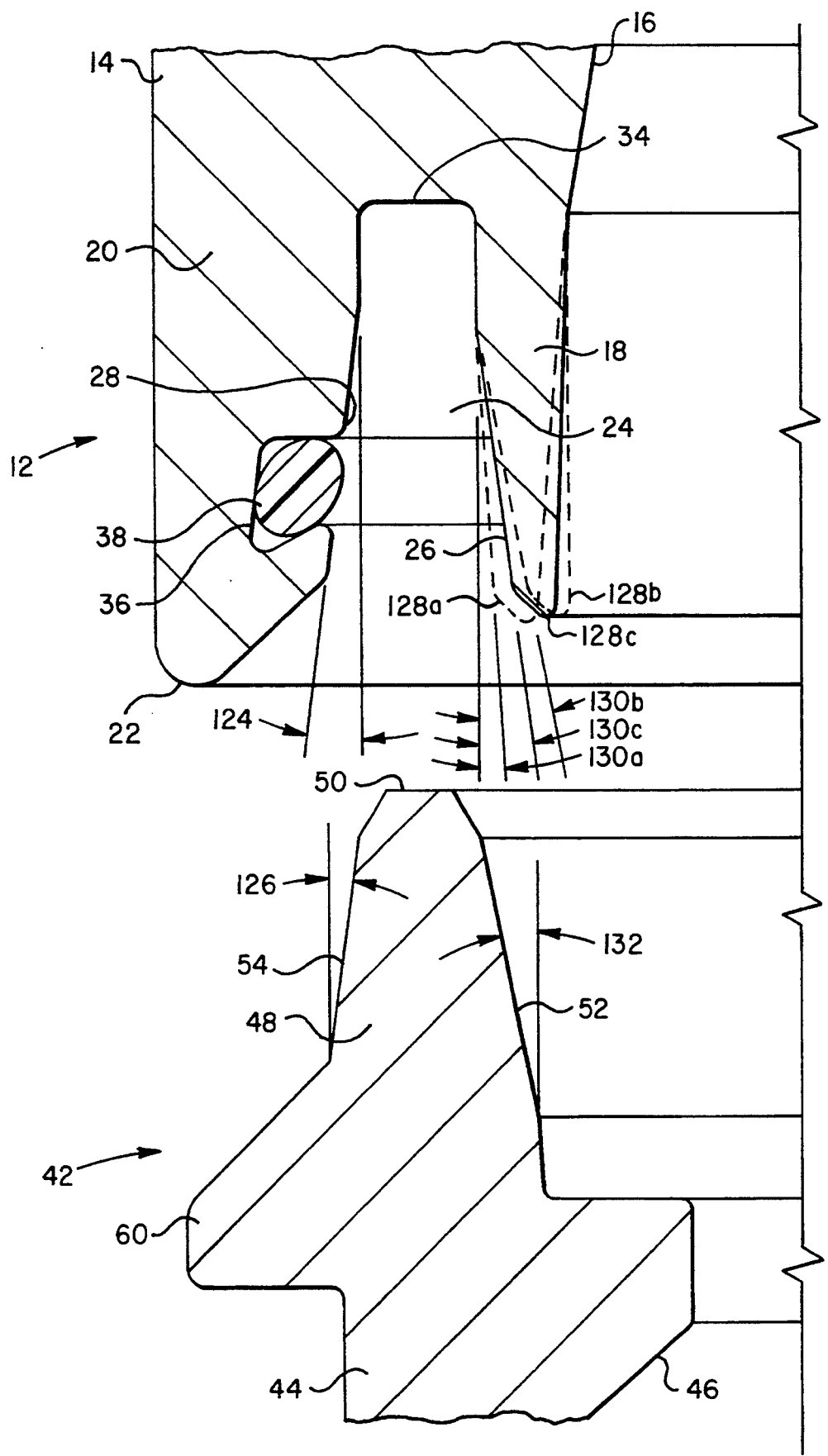
FIG. 2 is an enlarged partial sectional view of the metal-to-metal seal of the present invention shown in FIG. 1, but shown in a disconnected position and showing the inner seal leg in various flexed and unflexed positions.

Referring now to both FIG. 1 and FIG. 2, coupling 10 has a female member 12 for threaded connection to one of the pipe ends which is to be sealingly coupled. Female member 12 has a body 14 and an axial bore 16 therethrough for the passage of fluid. A metal inner annular seal leg 18 extends from body 14 of female member 12. Also extending from body 14 is metal outer annular seal leg 20 having a rim 22. Outer seal leg 20 is thicker and has more rigidity than inner seal leg 18.

Inner seal leg 18 extends concentrically within outer seal leg 20. Inner and outer seal legs 18 and 20 define between them an annular sealing recess 24. Inner and outer seal legs 18 and 20 have opposed tapered walls or sealing surfaces 26 and 28. Outward facing opposed tapered wall 26 is located on inner seal leg 18 and inward facing opposed tapered wall 28 is located on outer seal leg 20. The opposed tapered walls 26 and 28 define respectively an inner female sealing surface and an outer female sealing surface. Separating opposed tapered walls 26 and 28 is a downward facing, flat base 34. Outer seal leg 20 also has a seal groove 36 for housing back-up elastomeric seal 38.

Referring still to both FIG. 1 and FIG. 2, coupling 10 further has a male member 42 for threaded connection to the other of the hydraulic pipe ends which is to be sealingly coupled. Male member 42 has a body 44 and an axial bore 46 therethrough for the passage of fluid. An annular metal sealing wedge 48 extends from body 44 of male member 42. Sealing wedge 48 has a rim 50. Sealing wedge 48 also has an inner tapered wall 52 and outer tapered wall 54. Inner and outer tapered walls 52 and 54 define an inner male sealing surface and an outer male sealing surface, respectively. Male member 42 also has a circumferential protrusion 60 where the outside of sealing wedge 48 and the outside of body 44 meet.

Referring now mainly to FIG. 1, a stationary base 64 is shown. Stationary base 64 has an opening 66 for accepting male member 42. Retaining means 68, in conjunction with protrusion 60, serves to fixedly couple stationary base 64 to male member 42 so that there is no axial movement between stationary base 64 and male member 42. Also shown in FIG. 1 is retrievable base 70. Retrieval base 70 has an opening 72 for slidably engaging female member 12. Retaining means 74 and belleville washers 76 allow female member 12 to axially slide within opening 72 of retrievable base 70 while maintaining female member 72 biased towards male member 42.

Still referring mainly to FIG. 1, check valve assemblies may be employed with both female member 12 and male member 42. Referring first to the check valve assembly on female member 12, check valve body 80 has a conical portion 82 that conforms to valve seat 84 on female member 12. Extending from check valve body 80 is a valve tip 86. One end of a valve spring 88 is in contact with check valve body 80, while the other end of valve spring 88 is in contact with a spring collar 90 which has a flow passage 92 and which is kept in place within female member 12 by the end of the pipe which is threadedly attached to female member 12 through threads 94. Valve spring 88 maintains conical portion 82 of check valve body 80 biased towards a closed position, that is, against valve seat 84. Check valve body 80 has a vertical passage 96 and a plurality of horizontal passages 98 to allow fluid to flow through the check valve body when the check valve body is in the open position, that is, when conical portion 82 is not in sealing engagement with valve seat 84.

Referring next to the check valve assembly on male member 42, the check valve assembly on male member 42 is very similar to the check valve assembly on female member 12. Check valve body 100 has a conical portion 102 that conforms to valve seat 104 on male member 42. Extending from check valve body 100 is a valve tip 106. One end of a valve spring 108 is in contact with check valve body 100, while the other end of valve spring 108 is in contact with a spring collar 110 which has a flow passage 112 and which is kept in place within male member 42 by the end of the pipe which is threadedly attached to male member 42 through threads 114. Valve spring 100 maintains conical portion 102 of check valve body 100 biased towards a closed position, that is, against valve seat 104. Check valve body 100 has a vertical passage 116 and a plurality of horizontal passages 118 to allow fluid to flow through the check valve body when the check valve body is in the open position, that is, when conical portion 102 is not in sealing engagement with valve seat 104.

In operation, coupling 10 operates as follows. The end of a stationary hydraulic pipe is threadedly attached to male member 42 which is in turn fixedly coupled to stationary base 64 through retaining means 68. Stationary base 64 is located at the sea bottom. The end of a retrievable hydraulic pipe is threadedly attached to the end of female member 12 which is slidably engaged to retrievable base 70 and is biased toward male member 42 by belleville washers 76. Retrievable base 70 is lowered from the surface to the sea bottom to where it is in substantial axial alignment and in proximate vicinity of the stationary base.

As retrievable base 70 is brought closer to stationary base 64, so is female member 12 brought closer to male member 42. Even if female member 12 and male member 42 are not perfectly aligned, either axially and/or angularly, the shape of sealing recess 24 and sealing wedge 48 and the displacement allowed by belleville washers 76 allow sealing recess 24 and sealing wedge 48 to come into sealing engagement despite the axial and/or angular offset.

Figure 3:
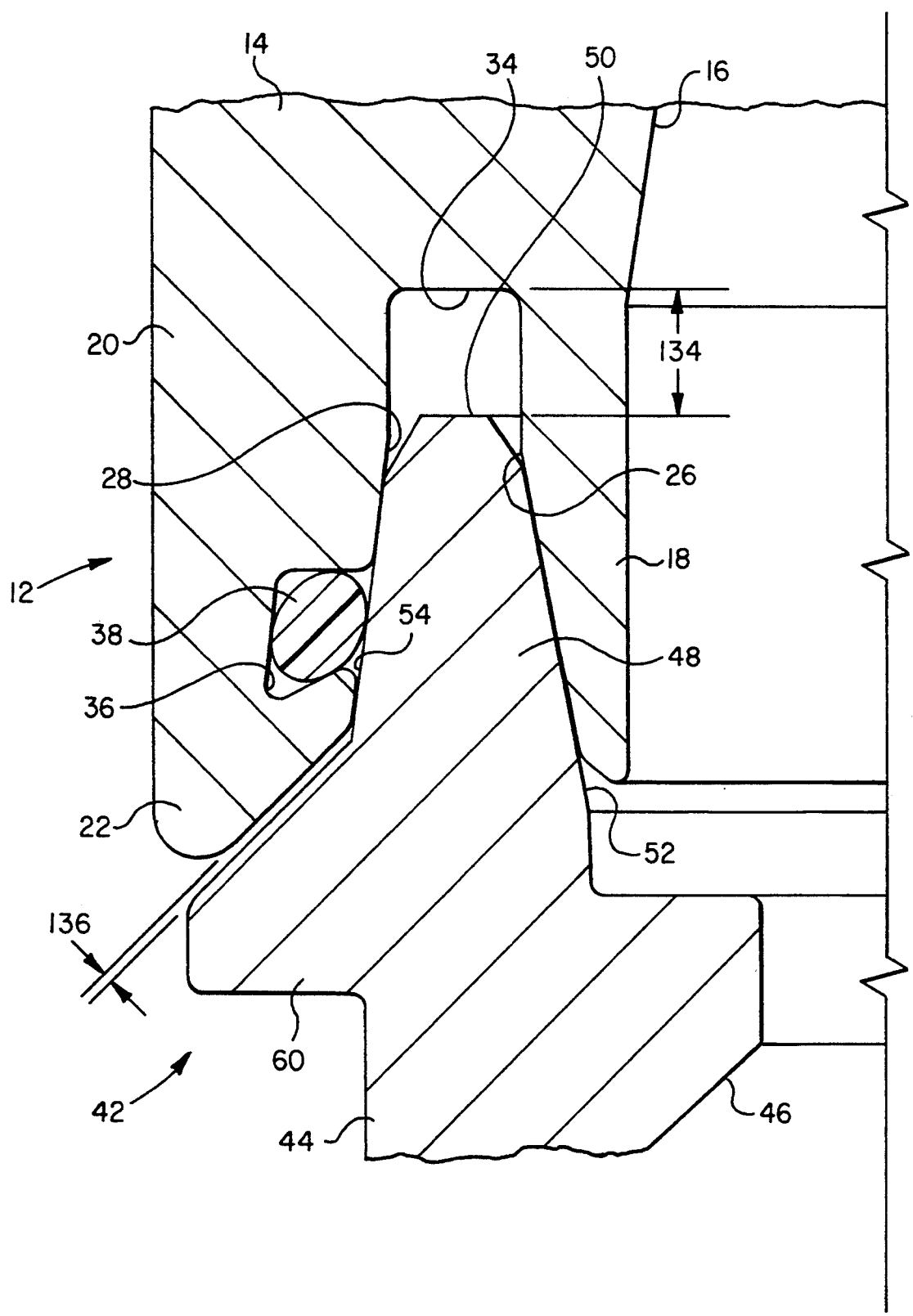
FIG. 3 is an enlarged partial sectional view of the seal of FIG. 1 shown in a connected position.

Referring now mainly to FIG. 2 and FIG. 3, after manufacture but prior to the first connection, taper angle 124 of tapered wall 28 is substantially the same as taper angle 126 of outer tapered wall 54 of sealing wedge 48. Also at this time, inner seal leg 18 is in a never-coupled position 128a. When inner seal leg 18 is in never-coupled position 128a, never-coupled taper angle 130a of tapered wall 26 is slightly smaller than taper angle 132 of inner tapered wall 52 of sealing wedge 48. If inner seal leg 18 did not flex, then the contact between tapered wall 26 and tapered wall 52 would only be along a line as apposed to along a surface.

However, after female member 12 and male member 42 come into contact, and as retrievable base 70 is then brought closer to stationary base 64, belleville washers 76 are compressed and female member 12 begins to axially slide inside retrievable base 70. The compression of belleville washers 76 due to the lowering of retrievable base 70 after female and male members 12 and 42 are already in contact results in an axial load being applied to female member 12 in the direction of male member 42. Since the only contact between female member 12 and male member 42 is along tapered walls 26, 28, 52, and 54, the entire axial load is supported through tapered walls 26, 28, 52, and 54. This results in a wedge-like action between sealing wedge 48 and sealing recess 24.

During the first connection, as the female and male members 12 and 42 are forced together by the axial load, inner seal leg 18 flexes, both elastically and plastically, inward toward coupled position 128b. When in coupled position 128b, tapered wall 26 is at coupled taper angle 130b, which is substantially the same as taper angle 132 of inner tapered wall 52 of sealing wedge 48. When inner seal leg 18 is in coupled position 128b, the contact between tapered wall 26 and tapered wall 52 is along a surface rather than along a line. As shown in FIG. 3, tapered wall 28 and tapered wall 54, and tapered wall 26 and tapered wall 52, are in substantially full surface contact.

When male member 42 and female member 12 are connected, a gap 134 remains between rim 50 of sealing wedge 48 and base 34 of sealing recess 24. Another gap 136 remains between rim 22 of outer annular seal leg 20 and protrusion 60 of male member 42. Gaps 134 and 136 ensure that the axial load through male member 42 and female member 12 is supported completely through tapered walls 26, 28, 52, and 54.

Since during the first connection inner seal leg 18 deforms both plastically and elastically, upon disconnection, inner seal leg 18 will not spring back to never-coupled position 128a, but will only spring back to decoupled position 128c. When in decoupled position 128c, tapered wall 26 will be at decoupled taper angle 130c. Decoupled position 128c is somewhere between never-coupled position 128a and coupled position 128b, and decoupled taper angle 130c will be smaller than coupled taper angle 130b but larger than never-coupled taper angle 130a. Upon subsequent connections, inner seal leg 18 deflects predominantly elastically, and will deflect substantially between decoupled position 128c and coupled position 128b.

Referring now primarily to FIG. 1, the check valve assemblies ensure that hydraulic fluid is not lost while female and male members 12 and 42 are not coupled. When female member 12 and male member 42 are not coupled, conical portion 82 of check valve body 80 is being forced into sealing contact with valve seat 84 so that fluid cannot flow out of female member 12. Likewise, conical portion 102 of check valve body 100 is being forced into sealing contact with valve seat 104 so that fluid cannot flow out of male member 42. During connection of male member 42 and female member 12, valve tip 106 of check valve body 100 comes into contact with valve tip 86 of check valve body 80. As the male and female members 42 and 12 are brought further together, check valve body 100 is displaced axially within male member 42 and check valve body 80 is displaced axially within female member 12, thus causing conical portions 102 and 82 to disengage valve seats 104 and 84. When conical portions 102 and 82 disengage valve seats 104 and 84, hydraulic fluid in female member 12 can flow through vertical passage 96 and horizontal passages 98 and out of or into female member 12, and the fluid in male member 42 can flow through vertical passage 116 and horizontal passages 118 and out of or into male member 42.

The tapered shape of the sealing wedge 48 and sealing recess 24 help to prevent elastomeric seal 38 from being "blown out" of seal groove 36. During disconnection of hydraulic coupling 10, there is often a great pressure differential between the inside and outside of coupling 10. During disconnection of male member 42 and female member 12, a gap is created through which the pressure differential is equalized. This gap increases in size as male member 42 and female member 12 are brought further apart. While the gap is small and the pressure differential is not yet equalized, fluid rushes at high velocity through the gap. If elastomeric seal 38 is located too close to the gap while the pressure differential is not yet equalized, elastomeric seal 38 can be "blown out" of seal groove 36. The tapered shapes of sealing wedge 48 and sealing recess 24 cause the pressure differential to be substantially equalized before elastomeric seal 38 gets close enough to the gap to be blown out.

The hydraulic coupling of the present invention results in several advantages. Since the axial load through male member 42 and female member 12 is supported solely through tapered walls or sealing surfaces 26, 28, 52, and 54, the axial load ensures a positive seal. Furthermore, the tapered shape of both sealing recess 24 and sealing wedge 48 ensure that even as sealing recess 24 and sealing wedge 48 wear down, a positive seal will be maintained. In other words, as sealing recess 24 wears down it gets larger, and as sealing wedge 48 wears down it gets smaller. However, the tapered shapes of the sealing surfaces and the fact that the axial load is supported only by the sealing surfaces allows sealing wedge 48 to travel further into sealing recess 24, thereby allowing the sealing surfaces to come into full contact with each other and thus maintaining a positive seal.

Another advantage of the present invention is that the shape of the sealing surfaces together with the displacement of female member 12 that is allowed by belleville washers 76 results in a hydraulic coupling that is capable of being connected and disconnected under large angular and axial offsets.

Another advantage of the present invention is that it is not as sensitive to debris since there is a relatively large sealing area.

Yet another advantage of the present invention is that the plastic deformation during the first assembly acts as a "final machining" process, making initial small manufacturing tolerances unnecessary. Also, the elastic deformation during each connection ensures that the application of the axial load results in substantially the entire sealing surfaces being in contact.

Still another advantage of the present invention is that since the primary seal is the metal-to-metal seal between tapered wall 52 and tapered wall 26, the metal-to-metal seal is less susceptible to wear and tear than elastomeric seals. Also, the simple design and lack of delicate elements of the present invention makes it more durable than metal seal hydraulic couplings built before this invention.

Still another advantage of the hydraulic coupler of the present invention is the increased service life of the coupler that results from the improved design.

While the invention has been particularly shown and described with reference to a preferred embodiment, it will be understood by those skilled in the art that various changes in form and detail may be made therein without departing from the spirit and scope of the invention.

What is claimed is:

1. In a hydraulic coupling having a female member and a male member, each having an annular body for sealing engagement one with the other, the female member and male member being maintained in axial engagement with each other by an axial load, the female member and male member each having an axial bore therethrough for the passage of fluid, the improvement comprising:

metal, concentric inner and outer annular seal legs extending from the body of the female member, defining an annular sealing recess between the seal legs;

the seal legs having opposed tapered walls that define female sealing surfaces;

an annular metal sealing wedge extending from the body of the male member having inner and outer tapered walls that define male sealing surfaces for insertion into the sealing recess for sealingly engaging the female sealing surfaces; and the axial load through the male and female members being supported solely through the male and female sealing surfaces so that the axial load results in a wedge-like action between the sealing recess and the sealing wedge, which deflects one of the seal legs thus allowing surface contact between the male and female sealing surfaces.

2. The hydraulic coupling according to claim 1 wherein the female member has an elastomeric seal located on one of the female sealing surfaces.

3. The hydraulic coupling according to claim 1 wherein the female member has an elastomeric seal located on the outer seal leg of the female member.

4. In a hydraulic coupling having a female member and a male member, each having an annular body for sealing engagement one with the other, the female member and male member being maintained in axial engagement with each other by an axial load, the female member and male member each having an axial bore therethrough for the passage of fluid, the improvement comprising:

metal, concentric inner and outer annular seal lens extending from the body of the female member, defining an annular sealing recess between the seal legs;

the seal legs having opposed tapered walls that define female sealing surfaces;

an annular metal sealing wedge extending from the body of the male member having inner and outer tapered walls that define male sealing surfaces for insertion into the sealing recess for sealingly engaging the female sealing surfaces;

the axial load through the male and female members being supported solely through the male and female sealing surfaces so that the axial load results in a wedge-like action between the sealing recess and the sealing wedge, which deflects one of the seal legs thus allowing surface contact between the male and female sealing surface; and a check valve in at least one of the axial bores for preventing flow through the bore while the male member and female member are not coupled.

5. The hydraulic coupling according to claim 1 wherein one of the seal legs of the female member has more rigidity than the other of the seal legs of the female member.

6. The hydraulic coupling according to claim 1 wherein the outer seal leg has more rigidity than the inner seal leg.

7. In a hydraulic coupling having a female member and a male member, each having an annular body for sealing engagement one with the other, the female member and male member being maintained in axial engagement with each other by an axial load, the female member and male member each having an axial bore therethrough for the passage of fluid, the improvement comprising:

metal, concentric inner and outer annular seal legs extending from the body of the female member, defining an annular sealing recess between the seal legs;

the seal legs having opposed tapered walls that define female sealing surfaces;

an annular metal sealing wedge extending from the body of the male member having inner and outer tapered walls that define male sealing surfaces for insertion into the sealing recess for sealingly engaging the female sealing surfaces;

the axial load through the male and female members being supported solely through the male and female sealing surfaces so that the axial load results in a wedge-like action between the sealing recess and the sealing wedge, which deflects one of the seal legs thus allowing surface contact between the male and female sealing surfaces; and a spring element acting on one of the members to bias the members axially toward each other.

8. The hydraulic coupling according to claim 1 wherein one of the seal legs of the female member has more rigidity than the other of the seal legs of the female member and wherein the seal leg with less rigidity deflects both plastically and elastically during the first coupling and predominantly elastically during subsequent couplings.

9. A metal-to-metal seal assembly for a hydraulic coupling having a female member and a male member, each having an annular body for sealing engagement one with the other, the female member and male member being maintained in axial engagement by an axial load, the female member and male member each having an axial bore therethrough for the passage of fluid, the metal-to-metal seal assembly comprising:

metal, concentric annular inner and outer seal legs extending from the body of the female member, the inner and outer seal legs having opposed tapered walls defining an annular sealing recess;

an annular metal sealing wedge extending from the body of the male member, the sealing wedge having inner and outer tapered walls that sealingly engage the tapered walls of the female member;

the outer seal leg having more rigidity than the inner seal leg, causing the inner seal leg to flex as the members are inserted into one another; and the inner and outer seal legs being separated by a base such that when the sealing wedge is in sealing engagement with the sealing recess a rim of the sealing wedge is spaced apart from the base resulting in a gap between the base and the rim of the sealing wedge.

10. The metal-to-metal seal assembly according to claim 9 wherein the female member has an elastomeric seal located on the outer leg which engages the outer tapered wall of the male member.

11. The metal-to-metal seal assembly according to claim 9 further comprising:

a stationary base having an opening for accepting one of the members and having retaining means for fixedly coupling said one of the members to the stationary base;

a retrievable base having an opening for slideably engaging the other of the members; and a spring element mounted on the retrievable base acting between said other of the members and the retrievable base to bias said other of the members in one axial direction so that upon coupling of the two members the spring element will exert the axial load between the two members.

12. The metal-to-metal seal assembly according to claim 9 wherein the inner seal leg deflects both plastically and elastically during the first coupling and predominantly elastically during subsequent couplings.

13. A hydraulic coupling comprising in combination:

a female member and a male member, each having an annular body for sealing engagement one with the other, the female member and male member being maintained in axial engagement with each other by an axial load, the female member and male member each having an axial bore therethrough for the passage of fluid;

metal, concentric inner and outer annular seal legs extending from the body of the female member defining an annular sealing recess between the seal legs;

the seal legs having opposed tapered walls that define female sealing surfaces;

an annular metal sealing wedge extending from the body of the male member having inner and outer tapered walls that define male sealing surfaces for insertion into the sealing recess for sealingly engaging the female sealing surfaces;

the outer seal leg having more rigidity that the inner seal leg;

the inner seal leg having a never-coupled taper angle on its tapered wall that is less than a taper angle on the inner tapered wall of the sealing wedge, causing the inner seal leg to flex inward as the members are inserted into one another;

a spring element acting on one of the members to bias the members axially toward each other; and the axial load through the male and female members being supported solely through the male and female sealing surfaces so that the axial load results in a wedge-like action between the sealing recess and the sealing wedge which deflects the inner seal leg inward thus allowing surface contact between the male and female sealing surfaces.

14. The hydraulic coupling according to claim 13 wherein the female member has an elastomeric seal located on one of the female sealing surfaces.

15. The hydraulic coupling according to claim 13 wherein the female member has an elastomeric seal located on the outer seal leg of the female member.

16. The hydraulic coupling according to claim 13 further comprising a check valve in at least one of the axial bores for preventing flow through the bore while the male member and female member are not coupled.

* * * * *

UNITED STATES PATENT AND TRADEMARK OFFICE
CERTIFICATE OF CORRECTION.

PATENT NO. : 5,370,153

DATED : December 6, 1994

INVENTOR(S) : Gary L. Galle

It is certified that error appears in the above-identified patent and that said Letters Patent is hereby corrected as shown below:

At column 2, line 11-12, "of FIG. 1 shown in a connected position." should be on line 11.
At column 6, line 56, "seal lens" should be --seal legs--.

Signed and Sealed this

Thirteenth Day of June, 1995

Attest:

BRUCE LEHMAN

Attesting Officer

Commissioner of Patents and Trademarks